United States Patent [19]
Booth et al.

[11] Patent Number: 5,735,375
[45] Date of Patent: Apr. 7, 1998

[54] NITROCARBURIZED COMPONENT FOR AN ELECTROMAGNETIC FRICTION CLUTCH ASSEMBLY

[75] Inventors: Dwight E. Booth, Milton, Wis.; David C. Gustin, Rockton; Paul A. Larson, Belvidere, both of Ill.; Robert A. Olsen, Janesville, Wis.

[73] Assignee: Dana Corporation, Toledo, Ohio

[21] Appl. No.: 656,666

[22] Filed: May 31, 1996

[51] Int. Cl.$^6$ ............................................. F16D 27/112
[52] U.S. Cl. ........................ 192/84.961; 192/107 M; 148/218; 335/279; 335/281
[58] Field of Search .................. 192/84.96, 84.961, 192/84.91, 107 R, 107 M, 70.14; 148/218, 318; 188/161, 163, 164; 335/279, 281

[56] References Cited

U.S. PATENT DOCUMENTS

| | | |
|---|---|---|
| 4,632,236 | 12/1986 | Koitabashi ............................ 192/84.961 |
| 4,793,871 | 12/1988 | Dawes et al. . |
| 4,904,316 | 2/1990 | Dawes et al. . |
| 5,119,915 | 6/1992 | Nelson . |
| 5,123,157 | 6/1992 | Cerny . |
| 5,252,146 | 10/1993 | Wen et al. . |
| 5,488,340 | 1/1996 | Maley et al. ............................ 335/281 X |

*Primary Examiner*—Richard M. Lorence
*Attorney, Agent, or Firm*—MacMillan, Sobanski & Todd

[57] ABSTRACT

An electromagnetically actuated friction clutch includes a rotatably driven input gear. A rotatable armature is connected to the input gear and includes a friction face and nitrocarburized outer surfaces. A pole piece has a pole face for engaging the friction face of the armature and nitrocarburized outer surfaces. An electromagnet generates an electromagnetic field to shift the armature from a disengaged position to an engaged position wherein the friction face of the armature and the pole face of the pole piece are frictionally engaged. An output shaft is driven by the input gear when the armature is in the engaged position. The nitrocarburized outer surfaces of the armature and the pole piece resist wear, while interior portions of the armature and pole piece direct magnetic flux flow along a desired path.

29 Claims, 3 Drawing Sheets

NITROCARBURIZED COMPONENT FOR AN ELECTROMAGNETIC FRICTION CLUTCH ASSEMBLY

BACKGROUND OF THE INVENTION

This invention relates in general to electromagnetically actuated friction clutch assemblies and in particular to nitrocarburized components for use in an electromagnetically actuated friction clutch assembly.

Clutches are well known devices which are commonly used in machinery to selectively connect a source of rotational power to a rotatably driven mechanism. A basic clutch structure includes an input shaft connected to the source of rotational power, an output shaft connected to the rotatably driven mechanism, and means for selectively connecting the input shaft to the output is shaft for concurrent rotation. When the means for selectively connecting is engaged, the input shaft is connected to the output shaft so as to rotatably drive the mechanism. When the means for selectively connecting is disengaged, the input shaft is disconnected from the output shaft, and the mechanism is not rotatably driven. Many different types of clutches are known in the art for accomplishing this general purpose.

In friction type clutches, the input shaft is connected to an input member which is rotatably driven by the source of rotational power. The input member is usually fixed in a predetermined axial position. Such a friction clutch further includes an armature which is constrained to rotate with the input member, but is free to move axially relative thereto between engaged and disengaged positions. In the engaged position, the armature frictionally engages an output member which is connected to the output shaft. When this occurs, the output shaft is driven to rotate with the input shaft. In the disengaged position, however, the armature is spaced apart from the output member and, therefore, provides no rotational driving connection therewith. Often, the armature is normally maintained in the disengaged position so as not to frictionally engage the output member unless affirmatively moved into the engaged position. Friction clutches of this general type are well known in the art.

In some friction clutches, an electromagnet is used to cause movement of the armature between the engaged and disengaged positions. Electromagnetically actuated friction clutches operate on the principle that a magnetic field which is created about a component formed from a magnetically permeable material will exert a mechanical force on that component. This mechanical force will urge the component to move to a position of minimum resistance relative to the flow of magnetic flux (lines of force) generated by the magnetic field, usually referred to as a position of minimum reluctance. Thus, in electromagnetically actuated friction clutches, the armature and the output member are usually both formed from a magnetically permeable material. When the electromagnet is energized, the electromagnetic field generated thereby attracts the armature toward the output member. As a result, the armature is moved from the disengaged position to the engaged position to connect the input shaft to the output shaft and, thus, cause the driven device to be rotatably driven by the source of rotational power.

The output member of the electromagnetically actuated friction clutch is typically embodied as an annular pole piece having a generally U-shaped cross section. The pole piece is formed having a flat pole face which is normally axially separated from the armature by a relative small air gap. Because they are both formed from a magnetically permeable material, the armature will be attracted to move axially toward the output member when the electromagnet is energized. To increase the magnitude of this magnetic attraction, and thereby increase the torque transmitting capability of the clutch as a whole, the armature and the pole face of the pole piece are frequently divided into one or more pole regions by a non-magnetically permeable material. These separate pole regions cause the magnetic flux generated by the electromagnet to jump back and forth several times across the air gap separating the armature and the pole face when the electromagnet is energized. For reasons which are well known in the art, this magnetic flux discontinuity structure, or more simply flux break, is effective to increase the magnitude of the magnetic attraction between the armature and the pole piece.

An armature and a pole piece frictionally engage one another when a clutch is energized. Friction surfaces of these components tend to wear and reduce the life of a clutch. To counter such wear, engaging components in a clutch have been made from materials such as high and medium carbon steels. The friction surfaces of the engaging components have been hardened by conventional methods, such as carburizing or flame hardening. While such construction has been found acceptable, the high and medium carbon steels tend to resist or impede the flow of magnetic flux. Furthermore, conventional hardening results in relatively large flux resistance.

In other clutch designs, multiple plates are designed to be frictionally engaged by energization of the clutch to transfer rotational power from an input shaft to an output shaft. Adjacent friction surfaces of these plates tend to wear and reduce the life of a clutch. To counter wear, the plates have been formed from high and medium steels and hardened by conventional methods. As stated above, while such construction has been acceptable, the high and medium steels and conventional hardening tend to impede the flow of magnetic flux.

The art continues to seek improvements. It would be desirable to form engaging components of a clutch, such as an armature and pole piece or multiple plates, from a magnetically permeable material which permits the flow of magnetic flux with less impedance than high and medium steels. Furthermore, it would be desirable to harden outer surfaces of the engaging components to resist wear from friction without resulting in relatively large flux resistance.

SUMMARY OF THE INVENTION

This invention relates to an improved construction for a component for use in an electromagnetically actuated clutch. The component, such as an armature, a pole piece or a plate, can be formed from a low carbon steel and treated with a nitrocarburizing process prior to assembly. The nitrocarburizing process forms desirable hardened outer surfaces and does not substantially affect inner regions of the component. The hardened outer surfaces resist wear from frictional engagement and the inner regions provide a path for magnetic flux flow with less impedance than high and medium carbon steels.

In a preferred embodiment, an electromagnetically actuated friction clutch includes a rotatably driven input gear. A rotatable armature is connected to the input gear and includes a friction face and nitrocarburized outer surfaces. A pole piece has a pole face for engaging the friction face of the armature and nitrocarburized outer surfaces. An electromagnet generates an electromagnetic field to shift the armature from a disengaged position to an engaged position wherein the friction face of the armature and the pole face of the pole piece are frictionally engaged. An output shaft is driven by the input gear when the armature is in the engaged position. The nitrocarburized outer surfaces of the armature and the pole piece resist wear, while interior portions of the armature and pole piece remain substantially unaffected and direct magnetic flux flow along a desired path.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
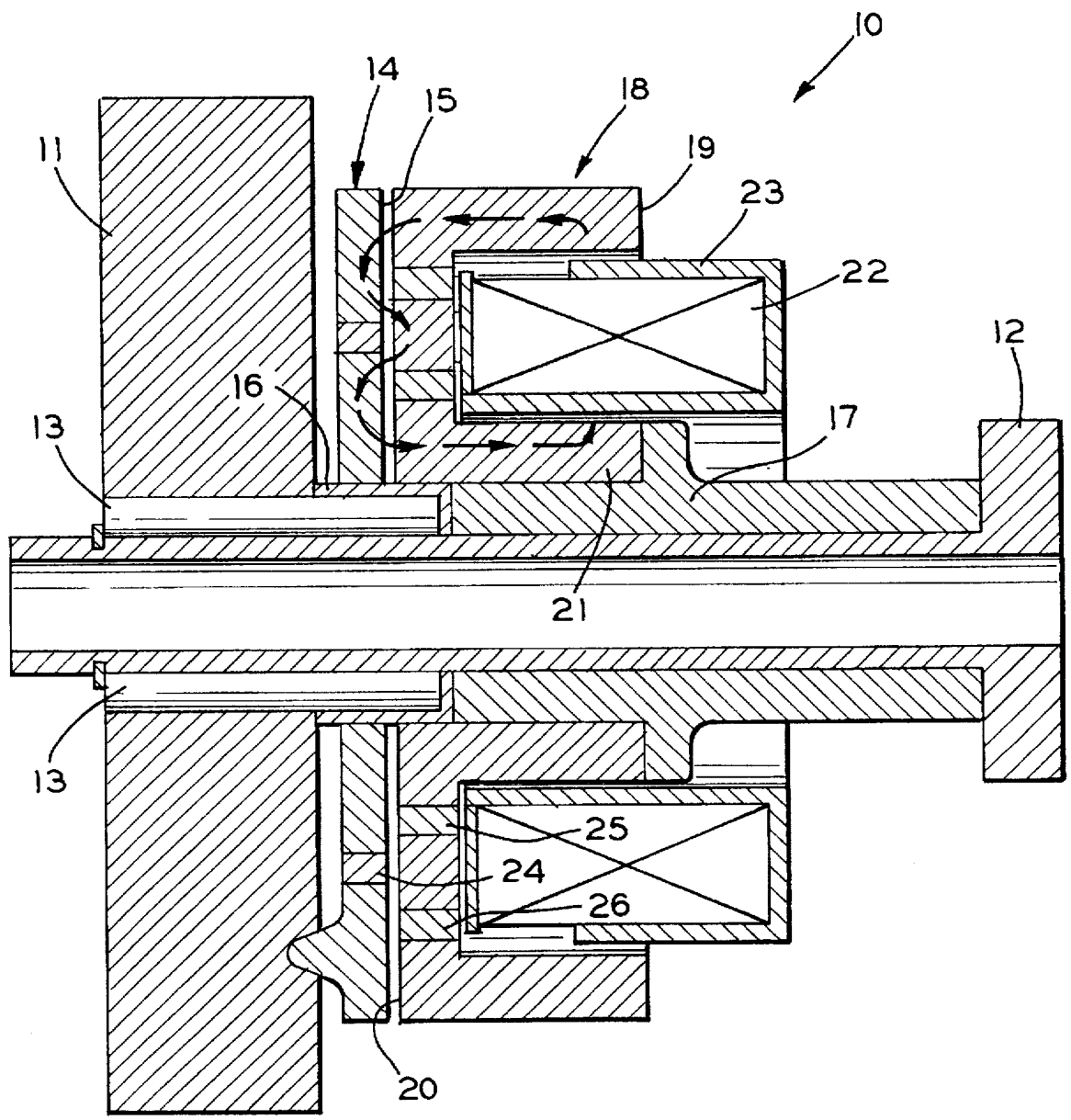
FIG. 1 is a schematical sectional view of an electromagnetically actuated friction clutch including an armature and a pole piece in accordance with this invention.

Referring now to the drawings, an electromagnetically actuated friction clutch, indicated generally at 10, in accordance with this invention is schematically illustrated in FIG. 1. The basic structure and operation of the clutch 10 are well known. For example, U.S. Pat. No. 4,187,939 to Silvestrini et al., assigned to the assignee of this invention, discloses a similar electromagnetically actuated friction clutch. U.S. Pat. No. 4,187,939 is incorporated herein by reference. Thus, only those portions of the electromagnetically actuated friction clutch 10 which are necessary for a complete understanding of this invention will be discussed.

The electromagnetically actuated friction clutch 10 is adapted to selectively connect a rotatably driven input member, such as an input gear 11, to a hollow cylindrical output shaft 12. The input gear 11 meshes with and is constantly rotatably driven by a source of rotational power (not shown) in any conventional manner. The input gear 11 is rotatably supported on the output shaft 12 by any conventional means, such as by a plurality of needle bearings 13. The electromagnetically actuated friction clutch 10 also includes an armature 14 which is connected to the input gear 11 for rotation therewith and for axial movement relative thereto in a known manner. The armature 14 is formed from a generally disk-shaped body having a radially extending friction surface or face 15. The armature 14 is also rotatably supported on the output shaft 12 by means of a low friction bearing sleeve 16. As will be explained in detail below, the armature 14 is primarily formed from a magnetically permeable material.

The electromagnetically actuated friction clutch 10 further includes a hollow cylindrical rotor 17 which is secured to the output shaft 12 for rotation therewith. A pole piece, indicated generally at 18, is mounted on the rotor 17 for rotation therewith. Thus, the pole piece 18, the rotor 17, and the output shaft 12 all rotate together as a unit. The pole piece 18 is annular and has a generally U-shaped cross section, defining an outer axially extending leg 19, a radially extending pole surface or face 20, and an inner axially extending leg 21. A coil 22 of an electrical conductor is provided within the pole piece 18 so as to function as an electromagnet. The coil 22 is supported in a non-rotatable manner relative to the pole piece 18 by any conventional support structure (not shown). The coil 22 may be contained within a housing 23 positioned between the outer and inner legs 19 and 21 of the pole piece 18. As will also be explained in detail below, the pole piece 18 is primarily formed from a magnetically permeable material.

As is well known, the coil 22 functions as an electromagnet when electrical current is passed therethrough. When so energized, the coil 22 generates an electromagnetic field. Magnetic flux flows along the path indicated by the arrows in FIGS. 1 and 2 from the coil 22 axially in a first direction (toward the left in figures) through the radially outer leg 19 of the pole piece 17 and across an air gap to the armature 14. Then, the magnetic flux flows radially inwardly through the adjacent surfaces of the armature 14 and the pole face 20 of the pole piece 18, jumping back and forth therebetween several times as shown. Next, the magnetic flux flows axially in a second direction (toward the right in figures) through the armature 14 and across an air gap to the radially inner leg 21 of the pole piece 18 back to the coil 22.

Normally, the armature 14 is maintained in the disengaged position illustrated in FIG. 1, wherein it is axially spaced apart from the pole piece 18. A conventional spring (not shown) or other known means may be used to urge the armature 14 toward the disengaged position. In this disengaged position, the armature 14 does not frictionally engage the pole face 20 of the pole piece 18. As a result, the pole piece 18, the rotor 17, and the output shaft 12 are not rotatably driven by the input gear 11. When the coil 22 is energized as described above, the flow of magnetic flux causes the armature 14 to be attracted toward the pole piece 18. If a sufficient amount of electrical current is passed through the coil 22, the armature 14 will move axially to an engaged position, wherein the friction face 15 of the armature 14 frictionally engages the pole face 20 of the pole piece 18. In this engaged position, the frictionally engagement of the armature 14 and the pole piece 18 causes the pole piece 18, the rotor 17, and the output shaft 12 to be rotatably driven by the input gear 11.

Figure 2:
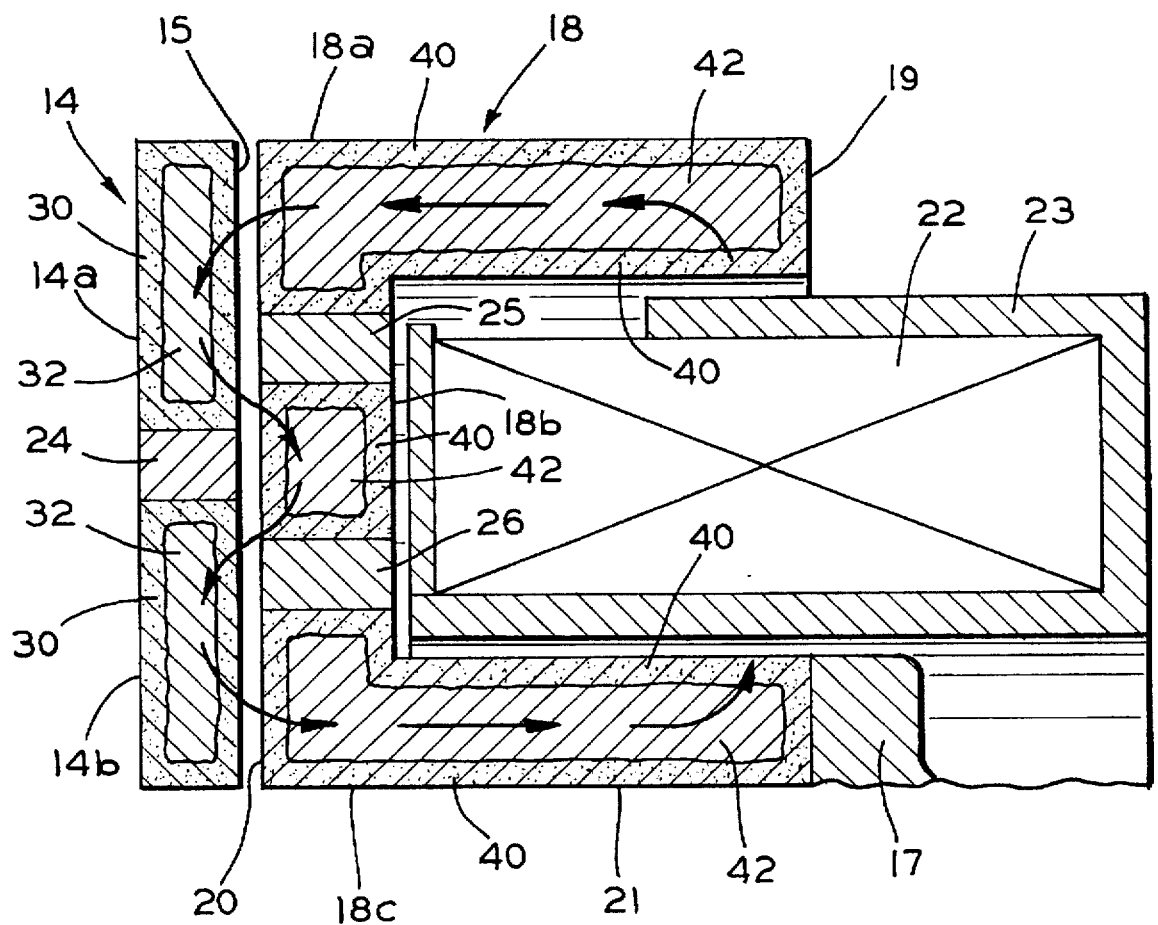
FIG. 2 is an enlarged view of a portion of the clutch of FIG. 1 illustrating treated outer surfaces of an armature and pole piece according to the present invention, wherein the thickness of the treated outer surfaces has been exaggerated for purposes of clarity of illustration.

To increase the magnitude of the magnetic attraction between the armature 14 and the pole piece 18, and thereby increase the torque transmitting capability of the clutch 10, the armature 14 is divided into a plurality of regions by a preform 24 formed from a non-magnetically permeable material. Preferably, the preform 24 is formed as a ring-like annular member that divides the armature 14 into a radially outer portion 14a and a radially inner portion 14b, as indicated in FIG. 2. Furthermore, to increase the magnitude of the magnetic attraction between the armature 14 and the pole piece 18, and thus increase the torque transmitting capability of the clutch 10, the pole piece 18 is divided into a plurality of regions. In the embodiment illustrated in the drawings, a first preform 25 and a second preform 26 are used to divide the pole piece 18 into a radially outer portion 18a, a radially middle portion 18b, and a radially inner portion 18c. Preferably, preforms 25 and 26 are formed as ring-like annular elements.

As stated above, each of the armature 14 and pole piece 18 is formed from magnetically permeable material, and each may be formed by any suitable means. Preferably, the each of the armature 14 and pole piece 18 are formed from a low carbon steel, such as SAE 1006, 1008 or 1010. As is well known, SAE 1010 steel has a maximum carbon content of approximately 0.13%. The preforms 24, 25 and 26 are formed from a non-magnetically permeable material. Preferably, the preforms 24, 25, and 26 are formed from an alloy of stainless steel powder and pressed in a conventional manner into a desired shape. If desired, other materials, such as relatively small amounts of copper or a lubricant, may be mixed with stainless steel powder prior to being pressed into a preform. In addition to advantages related to magnetic flux flow as described below, the use of low carbon steel to form the armature 14 and the pole piece 18 facilitates the use of a precision blanking process.

As a result of the preforms 24, 25 and 26, the magnetic flux created by the energized coil 22 flows along the path indicated by arrows in FIGS. 1 and 2. The magnetic flux travels axially along the outer extending leg 19 (to the left in the figures) and jumps the air gap to the outer portion 14a of the armature 14. However, the magnetic flux does not substantially permeate the preform 24. In order to complete the magnetic circuit, the magnetic flux jumps from the outer portion 14a to the middle portion 18b of the pole piece 18. Since preform 25 is formed from a non-magnetically permeable material, the magnetic flux does not travel directly from the outer portion 18a to the middle portion 18b. Instead, the magnetic flux is directed through the outer portion 14a of the armature 14.

Once at the middle portion 18b, the magnetic flux must jump to the inner portion 14b of the armature 14 since preform 26 is formed from a non-magnetically material. To complete the circuit, the magnetic flux jumps from the inner portion 14b of the armature 14 to the inner portion 18c. As is well known in this art, the flux breaks created by preforms 24, 25 and 26 increase the magnetic attraction between the armature 14 and the pole piece 18.

In the enlarged view of FIG. 2, treated outer surfaces of the armature 14 and the pole piece 18 according to the present invention are illustrated as speckled regions. For purposes of clarity of illustration, the thickness or depth these treated surfaces has been exaggerated in FIG. 2. Preparation of the armature 14 and the pole piece 18 as described below to create the treated outer surfaces further enhances the magnetic attraction between the armature 14 and the pole piece 18, thereby further enhancing the torque transmitting capability of the clutch 10.

Prior to assembly in the clutch 10, the armature 14 is treated with a nitrocarburizing process or an equivalent. Numerous nitrocarburizing processes are commercially known. In general, a nitrocarburizing process is a nitriding process conducted at temperatures below approximately 720 degrees Celsius to form non-metallic compound layers with nitrogen-rich substrates on non-alloy steel components.

A nitrocarburizing process which has been found acceptable in the present invention is known by the trademark NITROTEC and licensed by Lucas Electrical Ltd. of Birmingham, England. In the present invention, the nitrocarburizing process produces a thin, hard epsilon-iron nitride case or layer on the armature 14 by means of a low temperature, gaseous nitrocarburizing atmosphere with a black oxide formed on the epsilon case prior to a final quenching. The armature 14 can be heat treated and degreased after a quench to provide a clean dry surface prior to the nitrocarburizing process to enhance hardening requirements. The armature 14 can undergo stress relief prior to final machining to reduce cracking and excessive distortion from thermal shock or dimensional change during nitrocarburizing. Preferably prior to nitrocarburizing, the armature 14 will be clean and free of scale or oxide, entrapped sand, core material, metal particles, oil, and grease and will be completely dry.

In the present invention, the armature 14 is subjected to a nitrocarburizing process to form a boundary layer, indicated at 30 only in FIG. 2, at its outer surfaces. While the boundary layer 30 has been exaggerated in FIG. 2 for purposes of clarity of illustration, it preferably has a depth of up to 0.017 inch. The boundary layer 30 impedes magnetic flux flow and provides a desirable hardened surface. The interior portion, indicated at 32 only in FIG. 2 of the armature 14 is substantially unaffected by the nitrocarburizing process and thus is not hardened. The interior portion 32 provides an effective path for magnetic flux flow.

In a similar manner, the pole piece 18 can be treated with a nitrocarburizing process described above or an equivalent prior to assembly in the clutch 10. The nitrocarburizing process forms a boundary layer, indicated at 40 only in FIG. 2, at outer surfaces of the pole piece 18. While the boundary layer 40 has been exaggerated in FIG. 2 for purposes of clarity of illustration, it preferably has a depth of up to 0.017 inch. The boundary layer 40 impedes magnetic flux flow and provides a desirable hardened surface. The interior portion, indicated at 42 only in FIG. 2, of the pole piece 18 is substantially unaffected by the nitrocarburizing process and thus is not hardened. The interior portion 42 provides an effective path for magnetic flux flow.

Conventional armatures have been made from high carbon or medium carbon steel and then heat treated to provide hardened surfaces to reduce wear caused by frictional engagement with a pole piece. Armatures formed in this manner required a relatively high magnetic field to penetrate the hardened surfaces and travel through the medium and high carbon steel to provide the necessary magnetic attraction. The present armature 14 can be formed from low carbon steel and then subjected to a nitrocarburizing process to provide hardened surfaces to resist wear. The substantially unaffected interior portion 32 has less resistance to the magnetic field than the interior portion of a high or medium carbon steel armature, and tends to concentrate the density of the magnetic flux over a smaller area to provide a greater magnetic pull force than that found in a conventional armature with equal lines of flux. In a similar manner, the greater density of magnetic flux traveling through the unaffected area 42 of pole piece 18, resulting from the boundary layer 40, provides a greater magnetic pull force than that found in a conventional pole piece with equal lines of flux.

Figure 3:
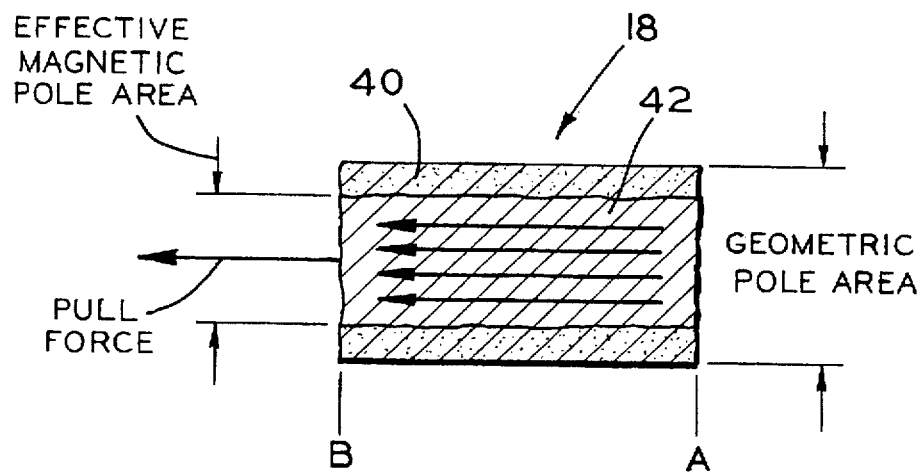
FIG. 3 is an enlarged view of a portion of the pole piece illustrated in FIGS. 1 and 2 illustrating the concentration of magnetic flux through an interior portion of the pole piece.
Figure 4:
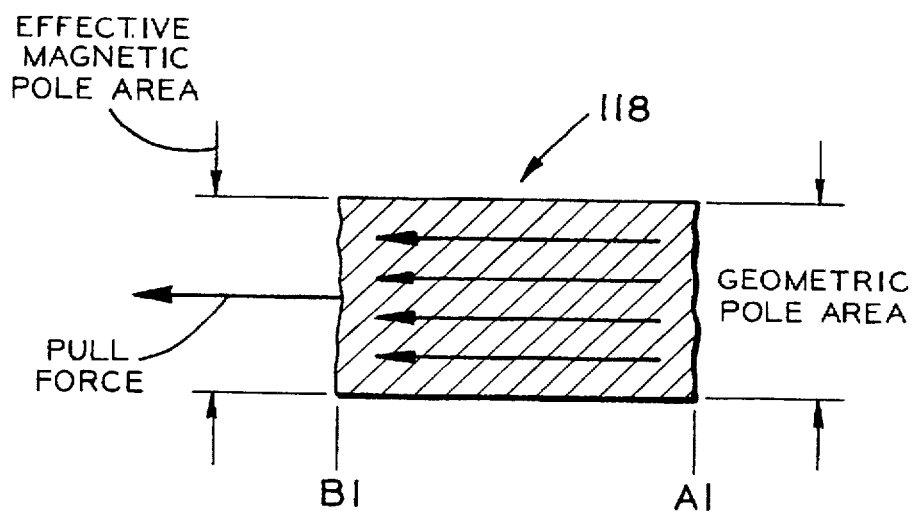
FIG. 4 is a sectional view of a conventional pole piece portion similar to the portion in FIG. 3 illustrating the flow of magnetic flux through the portion.

FIG. 3 illustrates an enlarged portion of the pole piece 18 of FIGS. 1 and 2. The Geometric Pole Area at point A is determined by calculating the area of the pole piece 18 using the outer dimensions of the pole piece 18. Because the boundary layer 40 tends to impede magnetic flux, the lines of magnetic flux, illustrated in FIG. 3 as a plurality of arrows, tends to travel through the unaffected interior portion 42. The Effective Magnetic Pole Area at point B is determined by calculating the area at B inward of the boundary layer 42. Thus, the Effective Magnetic Pole Area is less than the Geometric Pole Area. Magnetic Pull Force at B is determined by dividing the magnetic flux by the Effective Magnetic Pole Area. The resulting magnetic Pull Force at B is greater than the magnetic Pull Force for an conventional pole piece 118 illustrated in FIG. 4 which has not been treated in a nitrocarburizing process according to the present invention. As shown in FIG. 4, the Geometric Pole Area at point A1 is the same as the Effective Magnetic Pole Area at point B1. Therefore, when an equal number of lines of flux pass through the portion of pole piece 18 illustrated in FIG. 3 as in the portion of pole piece 118 of FIG. 4, the Pull Force at B1 is less than the Pull Force at B.

It is desirable that the magnetic flux jump back and forth only between the armature 14 and the pole piece 18, and not across annular gaps provided within each of the elements. To minimize jumping across annular gaps, the boundary layers 30 and 40 can be provided at all the outer surfaces of the armature and the pole piece 18. If desired, adjacent portions of the friction face 15 and the pole face 20 where magnetic flow flux between the faces is desired can be machined to remove some or all the boundary layers 30 and 40. Alteratively, since these locations are the frictionally engaging surfaces, the faces 15 and 20 can be left machined so that frictional engagement occurring from use will remove the boundary layers 30 and 40 after a period of use. In FIG. 2, arrows indicating magnetic flux flow between the armature 14 and the pole piece 18 are positioned at areas in the faces 15 and 20 where magnetic flux flow between the components is desired.

The armature 14 and the pole piece 18 illustrated in FIGS. 1 and 2 are separated into multiple portions by preforms 24, 25 and 26. In other embodiments, these preforms 24, 25 and 26 can be deleted, and/or gaps can be formed in the bodies of the armature 14 and/or the pole piece 18 to produce multiple flux breaks between the armature 14 and the pole piece 18.

The present invention can be applied to any desired components of electromagnetically actuated clutches. For example, in a multi-plate clutch, the plates can be treated with a nitrocarburizing process to form hardened outer surfaces and substantially unaffected interior portions. Preferably the depth of the hardened surfaces ranges up to 0.017 inch and the plates are formed from a low carbon steel, such as SAE 1006, 1008 or 1010. When incorporating components treated with the above-described invention in a clutch, the back magnetic circuit can be affected by the flow of magnetic flux through the substantially unaffected interior portions.

In accordance with the provisions of the patent statutes, the principle and mode of operation of this invention have been explained and illustrated in its preferred embodiment. However, it will be understood that this invention may be practiced otherwise than as specifically explained and illustrated without departing from its spirit or scope.

What is claimed is:

1. An electromagnetically actuated friction clutch comprising:

a rotatable input member;

a rotatable pole piece;

an armature connected to said input member for rotation therewith and for axial movement relative thereto between an engaged position, wherein said armature engages said pole piece, and a disengaged position, wherein said armature does not engage said pole piece, at least one of said pole piece and said armature being formed from a steel body having a carbon content of approximately 0.13% or less and having a hardened outer surface that is resistant to the flow of magnetic flux therethrough relative to the remainder of said body; and an electromagnetic coil for selectively moving said armature between said engaged and disengaged positions.

2. The electromagnetically actuated friction clutch defined in claim 1 wherein said pole piece is formed from a steel body having a carbon content of approximately 0.13% or less and has a hardened outer surface.

3. The electromagnetically actuated friction clutch defined in claim 1 wherein said armature is formed from a steel body having a carbon content of approximately 0.13% or less and has a hardened outer surface.

4. The electromagnetically actuated friction clutch defined in claim 1 wherein each of said pole piece and said armature is formed from a steel body having a carbon content of approximately 0.13% or less and has a hardened outer surface.

5. The electromagnetically actuated friction clutch defined in claim 1 wherein said armature is divided into inner and outer portions by a non-magnetically permeable material.

6. The electromagnetically actuated friction clutch defined in claim 1 wherein said pole is divided into inner, middle, and outer portions by a non-magnetically permeable material.

7. The electromagnetically actuated friction clutch defined in claim 1 wherein a portion of said hardened outer surface is absent from said steel body where the flow of magnetic flux is desired.

8. An electromagnetically actuated friction clutch comprising:

a rotatable input member;

a rotatable pole piece;

an armature connected to said input member for rotation therewith and for axial movement relative thereto between an engaged position, wherein said armature engages said pole piece, and a disengaged position, wherein said armature does not engage said pole piece, at least one of said pole piece and said armature being formed from a body having a hardened outer surface that is resistant to the flow of magnetic flux therethrough relative to the remainder of said body, a portion of said hardened outer surface being absent from said body where the flow of magnetic flux is desired; and an electromagnetic coil for selectively moving said armature between said engaged and disengaged positions.

9. The electromagnetically actuated friction clutch defined in claim 8 wherein said pole piece is formed from a body having a portion of said hardened outer surface absent therefrom.

10. The electromagnetically actuated friction clutch defined in claim 8 wherein said armature is formed from a body having a portion of said hardened outer surface absent therefrom.

11. The electromagnetically actuated friction clutch defined in claim 8 wherein each of said pole piece and said armature is formed from a body having a portion of said hardened outer surface absent therefrom.

12. The electromagnetically actuated friction clutch defined in claim 8 wherein said armature is divided into inner and outer portions by a non-magnetically permeable material.

13. The electromagnetically actuated friction clutch defined in claim 8 wherein said pole is divided into inner, middle, and outer portions by a non-magnetically permeable material.

14. The electromagnetically actuated friction clutch defined in claim 8 wherein said body is formed from steel having a carbon content of approximately 0.13% or less.

15. An electromagnetically actuated friction clutch comprising:

a rotatable input member;

a rotatable pole piece;

an armature connected to said input member for rotation therewith and for axial movement relative thereto between an engaged position, wherein said armature engages said pole piece, and a disengaged position, wherein said armature does not engage said pole piece, each of said pole piece and said armature being formed from a steel body having a carbon content of approximately 0.13% or less and having a hardened outer surface that is resistant to the flow of magnetic flux therethrough relative to the remainder of said body, portions of each of said hardened outer surfaces being absent from said pole piece and said armature where the flow of magnetic flux is desired; and an electromagnetic coil for selectively moving said armature between said engaged and disengaged positions.

16. The electromagnetically actuated friction clutch defined in claim 15 wherein said armature is divided into inner and outer portions by a non-magnetically permeable material.

17. The electromagnetically actuated friction clutch defined in claim 15 wherein said pole is divided into inner, middle, and outer portions by a non-magnetically permeable material.

18. A pole piece for use in an electromagnetically actuated friction clutch comprising a generally U-shaped steel body having a carbon content of approximately 0.13% or less and having a hardened outer surface that is resistant to the flow of magnetic flux therethrough relative to the remainder of said body.

19. The pole piece defined in claim 18 wherein said body is divided into inner, middle, and outer portions by a non-magnetically permeable material.

20. The pole piece defined in claim 18 wherein a portion of said hardened outer surface is absent from said body where the flow of magnetic flux is desired.

21. An armature for use in an electromagnetically actuated friction clutch comprising a disk-shaped steel body having a carbon content of approximately 0.13% or less and having a hardened outer surface that is resistant to the flow of magnetic flux therethrough relative to the remainder of said body.

22. The armature defined in claim 21 wherein said body is divided into inner and outer portions by a non-magnetically permeable material.

23. The armature defined in claim 21 wherein a portion of said hardened outer surface is absent from said body where the flow of magnetic flux is desired.

24. A pole piece for use in an electromagnetically actuated friction clutch comprising a generally U-shaped steel body including a hardened outer surface defining a boundary layer having a depth of up to 0.017 inch.

25. The pole piece defined in claim 24 wherein said body is divided into inner, middle, and outer portions by a non-magnetically permeable material.

26. The pole piece defined in claim 24 wherein a portion of said hardened outer surface is absent from said body where the flow of magnetic flux is desired.

27. An armature for use in an electromagnetically actuated friction clutch comprising a disk-shaped steel body including a hardened outer surface defining a boundary layer having a depth of up to 0.017 inch.

28. The armature defined in claim 27 wherein said body is divided into inner and outer portions by a non-magnetically permeable material.

29. The armature defined in claim 27 wherein a portion of said hardened outer surface is absent from said body where the flow of magnetic flux is desired.

* * * * *